United States Patent [19]

Messer

[11] Patent Number: 4,477,353

[45] Date of Patent: Oct. 16, 1984

[54] METHOD OF RECLAIMING WATER AND COAL FROM COAL TREATMENT UNDERFLOW BY TWO-STAGE SEPARATION OF SOLIDS

[75] Inventor: Leonard Messer, Pittsburgh, Pa.

[73] Assignee: American Minechem Corporation, Coraopolis, Pa.

[21] Appl. No.: 305,441

[22] Filed: Sep. 25, 1981

Related U.S. Application Data

[63] Continuation of Ser. No. 115,017, Jan. 24, 1980, abandoned, which is a continuation of Ser. No. 941,055, Sep. 11, 1978, abandoned, which is a continuation-in-part of Ser. No. 608,059, Aug. 27, 1975, abandoned, which is a continuation of Ser. No. 540,348, Jan. 13, 1975, abandoned.

[51] Int. Cl.$^3$ .................... B03D 3/00; B01D 21/01

[52] U.S. Cl. .................... 210/633; 210/704; 210/727; 209/5

[58] Field of Search .............. 210/633, 634, 704, 727, 210/703; 209/5

[56] References Cited

U.S. PATENT DOCUMENTS

| | | | |
|---|---|---|---|
| 3,148,140 | 9/1964 | Kaiser et al. | 210/634 |
| 3,408,293 | 10/1968 | Dajani et al. | 210/727 |
| 3,696,923 | 10/1972 | Miller | 210/704 X |
| 3,856,668 | 12/1974 | Shubert | 210/633 |

*Primary Examiner*—Thomas G. Wyse

*Attorney, Agent, or Firm*—Reed Smith Shaw & McClay

[57] ABSTRACT

Both water and carbonaceous material are reclaimed from an aqueous slurry of particles of coal that contains both carbonaceous and non-carbonaceous materials, the slurry being comprised of at least 60 percent water by weight. Preferably, the geometric mean particle size of the coal particles in the aqueous slurry is less than 150 microns. Preferably, the processed aqueous slurry is formed by mixing a low solids aqueous slurry of coal and ash fines from a coal washer with a high solids aqueous slurry of coal and ash fines from a settling pond. A fluid that is in a free-flowing liquid state at temperatures below 80° C. and, preferably, at temperatures below 20° C., and that is lyophobic to the water and the non-carbonaceous particles of the coal, and lyophillic to the carbonaceous fine particles of the coal is added to the aqueous slurry to form a first mixture in which less than 20 percent by weight of the fluid and the carbonaceous and non-carbonaceous coal particles is fluid. The first mixture is then agitated to preferentially agglomerate the carbonaceous particles to form carbonaceous agglomerates while the non-carbonaceous particles remain substantially dispersed in the slurry. The carbonaceous agglomerates are separated from the mixture to form a substantially non-carbonaceous aqueous slurry. A preferably high molecular weight flocculant that is lyophobic to water and lyophilic to non-carbonaceous material is thereafter added to the non-carbonaceous aqueous slurry to form a second mixture, and flocculated solids precipitated from the second mixture to form water and precipitate from the second mixture. Flocculated solids are then separated from the precipitate to provide a substantially solids-free aqueous solution. Preferably, the water separated from the second mixture is recirculated to a coal washing plant, and the solids-free aqueous solution separated from the precipitate is recirculated to the second mixture, or a coal washing plant, to form a closed water system for a coal washing plant.

20 Claims, 2 Drawing Figures

METHOD OF RECLAIMING WATER AND COAL FROM COAL TREATMENT UNDERFLOW BY TWO-STAGE SEPARATION OF SOLIDS

RELATED APPLICATION

This application is a continuation of copending application Ser. No. 115,017, filed Jan. 24, 1980, now abandoned, which in turn is a continuation of application Ser. No. 941,055, filed Sept. 11, 1978, now abandoned, which in turn is a continuation-in-part of application Ser. No. 608,059, filed Aug. 27, 1975, now also abandoned, which in turn is a continuation of application Ser. No. 540,348, filed Jan. 13, 1975, now abandoned.

BACKGROUND OF THE INVENTION

Mechanized coal preparation plants use large quantities of water to remove coal fines from the coal. The effluent or underflow from the wash treatment typically contains 5 to 15% solids of coal having particle sizes in the range of 150 microns and less (i.e. 100 mesh Tyler sieve). Typically, the underflow is flocculated by addition of, for example, starch or polyacrylamide in a thickener. The solids content of the underflow is increased to typically about 50% in the thickener, and water reclaimed for recirculation to the coal washing plant.

The thickened underflow is then generally pumped to a settling pond where the solids settle out and the reclaimed water is made available for reuse in the coal washer. Such settling ponds are, however, increasingly difficult to construct and maintain. There is often limited land available at the coal washing plant, which requires pumping of the underflow over long distances at substantial cost. Moreover, even where there is land available adjacent the washing plant, environmental laws have made such settling ponds difficult and expensive to construct and operate in compliance with state and federal regulations. And, permanent use of settling ponds presents the problems and costs of disposing of the sediment. In addition, such settling ponds result in loss of the carbonaceous material of coal in the thickened underflow.

Recently, various methods have been proposed for reclaiming coal fines from the underflow. One of these processes is the coal beneficiation process described in U.S. Pat. No. 3,665,066. Instead of flocculation in a thickener, a hydrocarbon such as kerosene or light fuel oil is added to the underflow in amounts typically of about 2 to 10% by weight of the solids in the underflow. The mixture is then agitated by conventional apparatus. The carbonaceous particles, being lyophobic to the water and lyophilic to the hydrocarbon, are preferentially wetted by the hydrocarbon and coalesce into dewatered, coarser agglomerates generally of diameters of up to 1 millimeter, while the other solids (which are lyophilic to water) remain suspended in the water. The carbonaceous agglomerates, in turn, are separated from the water and ash in a conventional separator, e.g. elutriator, cyclone or spiral, and the separated agglomerates pelletized in a balling device using seed particles of coarser coal. The difficulty with this process is that the water still contains roughly 1 to 5% solids, and, therefore, cannot be utilized in the coal washing plant. Generally, the effluent is still discharged to a settling pond. There, the solids are settled out to enable the water to be reused or, alternatively, discharged into rivers and streams in compliance with state and federal environmental regulations.

The present invention overcomes these difficulties and disadvantages of previous water reclaiming techniques. It totally eliminates the need for a settling pond, while reclaiming the water for use in a coal washing plant. Furthermore, it provides a method for reclaiming the carbonaceous material of coal fines from existing settling ponds, while optimizing the reclaimation process and eliminating the environmental and safety hazards of the numerous existing settling ponds.

SUMMARY OF THE INVENTION

A method is provided for reclaiming both water and the carbonaceous material of coal from an aqueous slurry of particles of coal that contains both carbonaceous and non-carbonaceous materials. Preferably, the slurry is comprised of at least 60 percent water by weight and the geometric mean particle size of the coal particles in the aqueous slurry is less than 150 microns. A fluid that is lyophobic to water and the non-carbonaceous particle of the coal and lyophilic to the carbonaceous particles of the coal is added to the aqueous slurry to form a first mixture in which less than 20 percent by weight of the fluid and carbonaceous and non-carbonaceous coal particles is fluid. The fluid is such that it is in a free-flowing liquid state at temperatures below 80° C. and, preferably, at temperatures below 20° C. The first mixture is agitated to preferentially agglomerate the carbonaceous particles to form carbonaceous agglomerates while the non-carbonaceous particles remain substantially disposed in the slurry. The carbonaceous agglomerates are then separated from the first mixture to form a substantially non-carbonaceous aqueous slurry substantially free of carbonaceous material and agglomerating fluid.

A flocculant that is lyophobic to water and lyophilic to non-carbonaceous material is then added to the non-carbonaceous aqueous slurry to form a second mixture. The lyophobic flocculant is of a molecular weight greater than 100,000, preferably greater than 1,000,000, and most desirably between 3,000,000 and 15,000,000. Flocculated solids are then precipitated from the second mixture to separate water from the second mixture. Flocculated solids are then separated from the precipitate to form an aqueous solution that is substantially free of solids. Thereafter, the separated flocculated solids preferably are dewatered and pelletized as hereinafter described.

Preferably, the method provides a closed system for a coal washing plant so that only relatively small quantities of additional fresh water are needed for continuous operation of the coal washing plant. In accordance with the preferred method the water separated from the non-coal aqueous slurry is recirculated to the coal washing plant, and, also in accordance with the preferred method the solids-free aqueous solution is recirculated to the second mixture or, alternatively to the coal washing plant. Where the solids-free aqueous solution contains substantial quantities of flocculant, the flocculant is preferably reused in the precipitation step; and the water of the solids-free aqueous solution is clarified and separated from the second during precipitation, and recirculated to the coal washing plant.

Another preferred embodiment involves optimizing the operating efficiency of the method, while reclaiming the carbonaceous material of coal sediment from existing settling ponds. Specifically, while the method is utilizable with slurrys of widely varying solids concentration, generally 5 to 40% solids content and typically 20 to 25% solids content by weight in the slurry is provided for efficient operation. Typically, the aqueous slurry as it comes from a coal washing plant is of relatively low solids content, e.g. 5 to 15%. An aqueous slurry of coal and ash fines having relatively high solids content, i.e. at least about 50% solids by weight, is available from the sediment of existing settling ponds. By mixing the high solids aqueous slurry with the low solids aqueous slurry in the appropriate proportion, the operation of the method can be optimized and the sediment of existing settling ponds can be removed and the carbonaceous material therein reclaimed.

The carbonaceous agglomerates separated from the first mixture may be in certain instances utilized directly in that form. However, the carbonaceous agglomerates are preferably pelletized into larger and denser carbonaceous pellets that are more suitable for general use. The pelletizing may be accomplished by the balling procedure described in U.S. Pat. No. 3,665,066, cited above. Preferably, however, the pelletizing is accomplished by adding a binder, such as a heavy hydrocarbon, to the separated carbonaceous agglomerates, that is lyophobic to water and lyophilic to carbonaceous material to form a third mixture, and agitating the third mixture to dewater and pelletize the carbonaceous agglomerates.

Other details, objects and advantages of the invention will become apparent as the following description of the presently preferred embodiments and presently preferred methods of practicing the same proceeds.

BRIEF DESCRIPTION OF THE DRAWINGS

In the accompanying drawings are shown presently preferred embodiments of the invention and are illustrated present preferred methods of practicing the same, in which.

DESCRIPTION OF THE PREFERRED EMBODIMENTS

Figure 1:
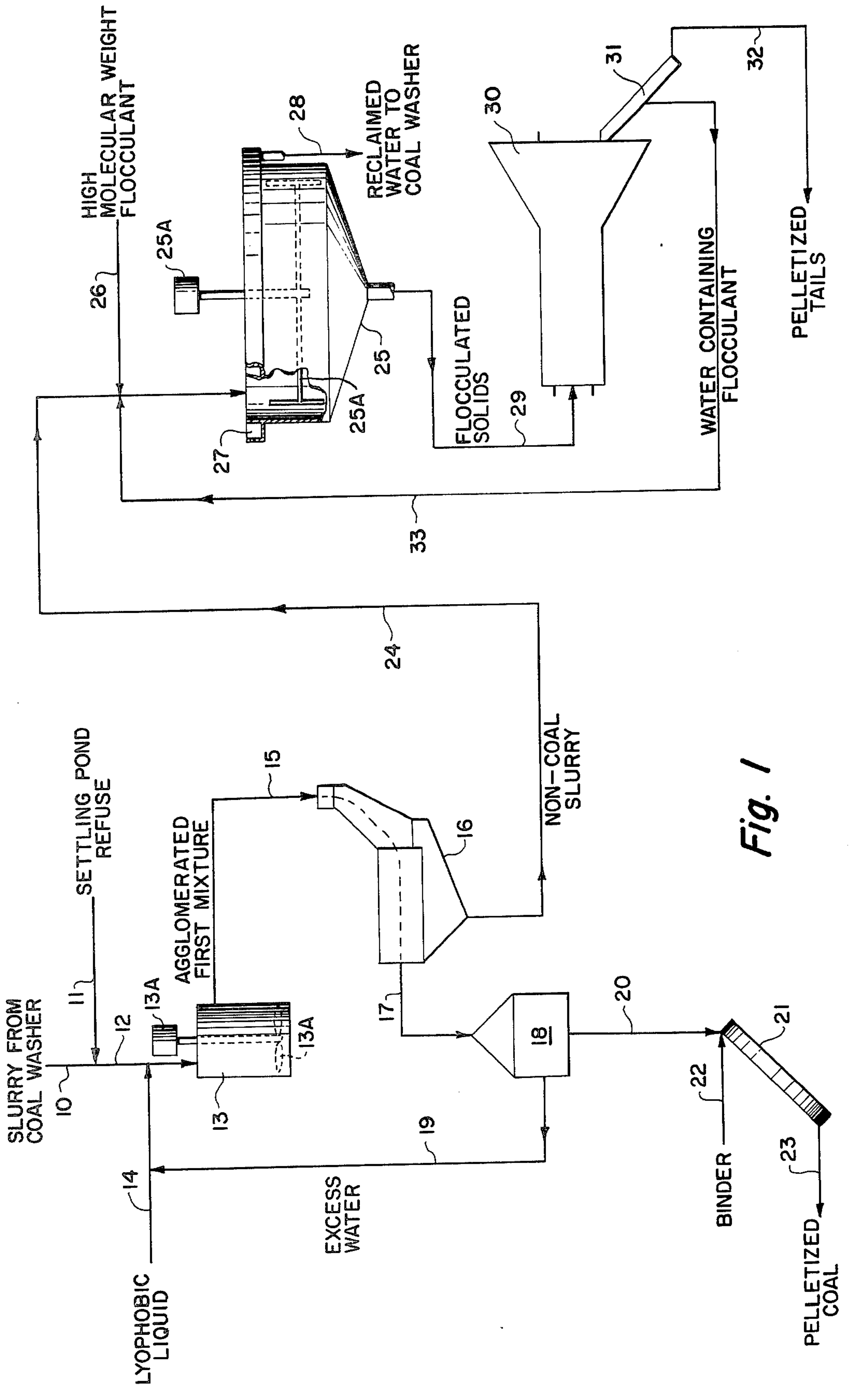
FIG. 1 is a schematic of a method of reclaiming water and coal from coal treatment underflow by two-stage separation of solids.

Referring specifically to FIG. 1, a method is shown for reclaiming both water and the carbonaceous material found in coal from the underflow from a coal washing plant. An aqueous slurry 10 of coal particles typically of relatively low solids content, e.g. 5 to 15% solids, flows from a coal washer through a conduit or pipe. The coal particles in aqueous slurry 10 comprise a mixture of carbonaceous particles and non-carbonaceous particles. Non-carbonaceous particles are small particles of essentially non-carbonaceous material present in mined coal, material that generally appears as ash rather than volatiles on burning of the coal. "Carbonaceous particles" are small particles of essentially carbonaceous material present in mined coal, material that is generally consumed as a volatile upon burning of the coal. The small particles of carbonaceous and non-carbonaceous material are preferably of less than 0.600 millimeter (28 Tyler mesh) in size and, typically, are less than 0.200 millimeter (65 Tyler mesh) in size. Preferably, the geometric mean size of the fine or small particles is less than 150 microns. Preferably, aqueous slurry 10 is mixed with an aqueous slurry 11 of coal particles which is of relatively high solids content, i.e. at least about 50% solids, from the sediment of an existing settling pond adjacent the coal washing plant. Slurrys 10 and 11 are mixed in such proportion as to form a processable aqueous slurry 12 containing less than 40%, preferably between about 5 to 40%, and most typically 20 to 25% solids content by weight of carbonaceous and noncarbonaceous particles of coal.

Added to aqueous slurry 12 at the inlet to agitator apparatus 13 is a fluid 14 that is lyophobic to water and non-carbonaceous particles and lyophilic to carbonaceous particles to form a first mixture. "Lyophilic" as used herein means that, in a disperse system, there is a marked affinity (wettability) between a disperse component and the dispersion medium and/or another disperse component. Some examples are glue and water, rubber and benzene. "Lyophobic" as used herein means that, in a disperse system, there is substantially no affinity (wettability) between a disperse component and the dispersion medium and/or another disperse component. Examples are colloidal "solutions" of metals.

Fluid 14 is such that it is in a liquid state at temperatures below 80° C. and, most desirably, at temperatures below 20° C. Compositions particularly suitable for fluid 14 are light hydrocarbons having an initial boiling point greater than about 65° C. and preferably greater than 150° C. Specifically suitable are light oil, light fuel oil, heavy fuel oil, diesel fuel, and kerosene. Also suited are creosote, filtered anthracene oil, hydrogenerated filtered anthracene oil, lubricating oil such as SAE-20, and chlorinated biphenyls. Heavier hydrocarbon liquids such as heavy crude petroleum, oil shale crude, coal tar, and pitch are not preferred because they typically contain groups lyophilic to non-carbonaceous particles as well as carbonaceous particles and, therefore, do not provide the degree of separation of carbonaceous and non-carbonaceous particles preferred in the present method. In addition, such heavy hydrocarbon liquids do not provide sufficient fluidity for the formation of discrete agglomerates in accordance with the present invention instead of an amalgam. Such heavy hydrocarbons may be utilized in certain instances in mixture with light hydrocarbons in concentrations of up to 50%. However, these heavier hydrocarbons cannot be used alone or with light hydrocarbons in concentration greater than 50%.

Fluid 14 is added in measured amounts to control the agglomeration of the carbonaceous particles as hereinafter described. Preferably, fluid 14 is added in amounts of from about 2 to 10% by weight and preferably from about 3 to 7% by weight of the total solids in aqueous slurry 12 for high recovery, e.g. 88–98% recovery. Lesser amounts of as little as 1% by weight and greater amounts up to but not exceeding 20% by weight may in some instances be utilized. However, such lesser and greater amounts are not preferred because sufficient agglomeration and binding of the carbonaceous particles is not provided, on the one hand, and a waste of highly refined hydrocarbon liquid results, on the other hand. Furthermore, fluid 14 must be added in amounts less than 20% by weight of the first mixture to provide discrete agglomerates as the present invention requires. Specifically, amounts greater than 20% by weight cannot be used because of the formation of an amalgam, or emulsion, instead of discrete agglomerates.

The first mixture of aqueous slurry 12 and fluid 14 is agitated in agitator apparatus 13 to form discrete agglomerates from the carbonaceous particles. Apparatus 13 may be of any suitable agitating device such as a modified turbine, disc or cone impeller mixer. Preferably, however, agitator apparatus 13 is a tank equipped with a motor driven propeller 13A extending to the bottom portion of the tank, such as a Premier Mill. In any case, the mixture is vigorously stirred to avoid high shear which would impede the uniformity and growth of the discrete agglomerates.

During the agitation in agitator apparatus 13, the carbonaceous particles are preferentially wetted by fluid 14, which is preferably immiscible with water, and the carbonaceous particles agglomerated into discrete agglomerates. The size of the agglomerates is dependent primarily upon the percentage of fluid 14 added to the aqueous slurry 12. For the preferred percentages of 2 to 10% by weight, the agglomerates typically have sizes from about 1 to 2 millimeters. The time required to effect agglomeration is generally dependent upon the degree of turbulence or agitation, with the shorter agglomeration time being associated with the higher agitation speed. During the agitation, the mixture changes from a black color associated with an aqueous slurry of coal to a lighter color associated with an aqueous slurry of ash. The color change occurs in roughly half the time required for effective agglomeration of the carbonaceous particles. The discrete agglomerates, being impregnated with fluid 14 which is generally less dense than water, will tend to float to the top in the first mixture.

The agglomerated first mixture 15 is then removed from the top of agitator apparatus 13 to a separator 16 which separates the discrete agglomerates from the water and the unagglomerated non-carbonaceous particles by size and/or density. Preferably, separator 16 is a sieve bend of an appropriate mesh size, e.g. 100 or 200 mesh Tyler, such as that manufactured by authority from DSM NV Vedernaldse Staatsmijnen. Alternatively, other commercially available size separators such as an elutriator, cyclone or spiral separator may be utilized. Alternatively, the discrete agglomerates may also be separated in a float-sink tank where the agglomerates, which tend to float, are skimmed off by a rotating paddle through an overflow, while the water and unagglomerated non-carbonaceous particles, which tend to sink, are removed through the bottom of the tank as a non-carbonaceous slurry underflow 24 that is substantially free of carbonaceous parties and the fluid 14.

The separated agglomerates 17 of carbonaceous particles may then be processed through dewatering apparatus 18, such as a centrifuge, to remove water absorbed on the agglomerates. As a matter of convenience, separated water 19 is recirculated back to and admixed with fluid 14. Dewatering apparatus 18 is not, however, necessary where the agglomerates are dried and used in that form, and is not generally necessary or preferred where the agglomerates are pelletized as hereinafter described.

Discrete carbonaceous agglomerates 17 or 20 may be utilized in that form. Preferably, however, discrete agglomerates 17 or 20 which generally contain about 7 to 12 percent moisture, are pelletized generally to particle sizes of 0.05 to 0.75 inch in diameter for more universal use. The pelletizing is preferably accomplished by feeding discrete agglomerates 20 to a pelletizing disc or tumbler along with a binder liquid and then agitating that combination. Preferably, the combination is agitated in a pelletizer 21 such as the 39-inch pelletizing disc manufactured by Dravo. Binder liquid 22 is mixed with discrete agglomerates 20 by premixing or direct feeding to the pelletizing disc or tumbler. Binder liquids particularly suited for this purpose are heavy hydrocarbons, such as coke-oven coal tar, oil-shale crude, petroleum crude or heavy fuel oil such as Bunker C, which is preferably heated to, for example, 100° C. to increase fluidity. The requirement for the binder liquid is that it be capable of producing a coherent pelletized product 23 in which the coal agglomerates are bonded together with sufficient strength to permit mechanized processing and handling of them without substantial crumbling. The primary object of pelletizing is to increase the size of the agglomerates in circumstances where this would be considered advantageous. In this connection, it may be desirable that the pelletized product 23 be subsequently oven dried at, e.g. 100° C., to bond the binder to and within the agglomerates. An accelerator is also preferably included in binder liquid 22 to hasten bonding of the binder in shorter times and/or at lower temperatures.

The size of the pelletized carbonaceous product 23 is controlled primarily by the percentage of binder 22 utilized, and the speed of rotation of the pelletizing disc or tumbler and residence time of the discrete agglomerates within the pelletizer. Typically, binder liquid 22 is added in amounts from 5 to 25% by weight of discrete agglomerates 20, with the least amount consistent with good pelletizing being most desirable. Typically, the residence time within the pelletizer 21 is about 10 minutes at a rotation speed of between roughly 10 and 20 rpm. The size and density of the pellets may also be controlled by seeding with nuclei such as described in U.S. Pat. No. 3,665,066, above referenced. However, such seeding is not preferred because the nuclei generally have a higher ash content than the discrete agglomerates and, therefore, reduce the carbonaceous content of the resulting pelletized product 23. A pelletized product of controlled size is generally obtainable by the pelletizing operation as described within the range of 0.05 to 0.75 inch in deameter.

Meanwhile, non-carbonaceous slurry 24 from separator apparatus 16 is circulated through suitable piping or conduit to a thickener 25. The slurry 24 is an aqueous slurry substantially free of carbonaceous particles and fluid 14, but still containing approximately 10% solids by weight mostly of non-carbonaceous particles.

At the inlet to the thickener 25, non-carbonaceous slurry 24 is mixed with a flocculant solution 26 of a flocculant that is lyophobic to water and lyophilic to non-carbonaceous particles to form a second mixture. Suitable flocculants for this purpose are high molecular weight polyacrylamides $(CH_2CHCONH_2)_n$, polyethylene oxides $(OCH_2CH_2)_n$, polyethylene imines $(CH_2CH_2NH)_n$, polyvinyl pyrrolidones $(C_6H_9NO)_n$, polysaccharides $(C_6H_{10}O_5)_n$, and copolymers and mixtures of these polymers with varying side and end groups, of greater than 100,000 molecular weight. Such high molecular weight polymers are preferably greater than 1,000,000 molecular weight, and most desirably between 3,000,000 and 15,000,000 molecular weight, with 9,000,000 molecular weight considered optimum. Higher molecular weight polymers of up to and greater than 20,000,000 may be used; however, such overly high molecular weights are not preferred because they are unduly expensive to make and do not provide residence times during flocculaton that result in high clarity in the reclaimed water. Flocculants available commercially which may be utilized to prepare flocculant solution 26 are set forth in Table I below.

TABLE I

| Manufacturer | Tradename of Flocculant |
|---|---|
| Allied Colloids (Y.C.L. Grade) | Polyflok 91APA |
| Allied Colloids (Y.C.L. Grade) | Polyflok 93APA |
| Allied Colloids (Y.C.L. Grade) | Polyflok 95APA |
| Allied Colloids (Y.C.L. Grade) | Polyflok 63 AP/W |
| Allied Colloids (Y.C.L. Grade) | Polyflok 13CL |
| Allied Colloids | Filtaflok 25AP |
| Allied Colloids | Magnafloc R155 |
| Allied Colloids | Magnafloc R156 |
| Allied Colloids | Magnafloc R270 |
| Allied Colloids | Magnafloc R140 |
| Allied Colloids | Magnafloc LT22 |
| Allied Colloids | Magnafloc LT24 |
| Allied Colloids | Magnafloc LT25 |
| Allied Colloids | Magnafloc LT26 |
| Badische-Anilin- & Soda Fabrik, AG | Sedipur TF |
| Badische-Anilin- & Soda Fabrik, AG | Sedipur LK4011 |
| Badische-Anilin- & Soda Fabrik, AG | Sedipur LK4034 |
| Stockhausen | Praestol 444K |
| Stockhausen | Praestol 114 |
| Stockhausen | Praestol 115 |
| Stockhausen | Praestol 2850 |
| Hercules Powder | Hercofloc 810 |
| Hercules Powder | Hercofloc 813 |
| Hercules Powder | Hercofloc 817 |
| Nalco | Nalfloc N603 |
| Nalco | Nalfloc N610 |
| Nalco | Nalfloc N671 |
| Nalco | Nalfloc N672 |
| Nalco | Nalfloc N673 |
| Nalco | Nalfloc A373 |
| Nalco | Nalfloc A375 |
| Nalco | Nalfloc A378 |
| American Cyanamid | Superfloc 500 Series |
| American Cyanamid | Superfloc 800 Series |
| American Cyanamid | Superfloc 992 |
| American Cyanamid | Superfloc 521 |
| Dow Chemical | Purifloc C31 |
| Dow Chemical | Purifloc C32 |
| Dow Chemical | Separan AP273 |
| B.T.I. | C.110 |
| B.T.I. | A.110 |
| B.T.I. | A.130 |
| B.T.I. | A.150 |
| B.T.I. | A.100(PWG) |
| B.T.I. | A.110(PWG) |
| B.T.I. | A.130(PWG) |
| B.T.I. | A.150(PWG) |
| B.T.I. | N.100(PWG) |

Such flocculants are mostly anionic; however, cationic flocculants are available and are preferred as an alternative or a complement to anionic flocculants in certain applications. Specifically, anionic flocculants are generally not effective to flocculate very small size fine particles, which generally carry a negative surface charge, while the cationic or positively charged flocculants are able to neutralize the surface charge of such small particles and produce faster settlement rates and reclaim water of higher clarity. However, cationic flocculants generally tend to be more expensive because the materials needed to make the polymer cationic are generally higher in price. In addition, cationic flocculants tend not to be as efficient in flocculation of large particle fines because cationic flocculants generally are of lower molecular weight than anionic flocculants. Cationic flocculatns also tend to be more difficult to dissolve and, therefore, reduce the speed and ease with which the flocculant solution may be prepared. In addition, non-ionic flocculants of high molecular weight may be used in certain applications where the composition and nature of the non-carbonaceous particles permit.

Flocculant 26 is preferably prepared in dilute solution by known procedures. The object of the preparation is to disperse the flocculant, which is in dry powder form, in water without producing agglomerates of the powder and without degradation of the high molecular weight polymers, which are sensitive to shear forces. Manual mixing is generally not preferred because of the time and care necessary to avoid the formation of gelatinous lumps or agglomerates, which are ineffective and wasteful. Preferably, the flocculant solution is automatically prepared batch-wise by use of large mixing and stock tanks. The flocculant solution is prepared in the mixing tank utilizing masterbatching dispersion The preparation is preferably commenced by introducing water to the mining tank until the impeller is covered. Then, the water and flocculant powder are simultaneously dispersed and introduced to the mixing tank through a disperser unit such as the Bretby Autex disperser, which disperses the flocculant powder into a high velocity, thin water stream When a measured amount of flocculant powder has been delivered to the mixing tank through the disperser, the mixing tank is further filled with water to a level corresponding to the desired dilution of the flocculant in the solution. Stirring with the impeller is thereafter continued until the flocculant powder is sufficiently dissolved in the water. When a signal is received from the stock tank indicating a low level in that tank, the prepared batch is emptied from the mixing tank to the stock tank, and the preparation cycle again commenced in the mixing tank. The dilution of the flocculant in the solution is thereby automatically controlled, and the only attention required is the addition of powdered flocculant to a suitable hopper at the mixing tank.

Flocculant 26 is then added to substantially noncarbonaceous slurry 24 in measured amounts of less than 0.2% by weight and preferably between 0.001 and 0.1% by weight of solids (dry weight) in slurry 24. Thorough mixing of the flocculant solution with the non-carbonaceous slurry is essential to efficient precipitation of the flocculated solids, but mixing usually requires application of shear to the polymer molecules from an impeller which ruptures and degrades the polymer. Accordingly, flocculant 26 is preferably added to non-carbonaceous slurry 24 at the inlet to thickener 25 where high turbulence is produced without the use of an impeller. The turbulent condition provides for better distribution of the flocculant through the slurry and provides maximum surface contact with the fines in the slurry. Thorough mixing of the flocculant 26 can be achieved by adding the flocculant solution at different inlets round the cross-section of thickener 25 and, if possible, at different points along the length of the pipe through which slurry 24 is conducted to thickener 25. Alternatively, thorough mixing can be provided by spraying the flocculant solution into a cascade of the non-carbonaceous slurry, or spraying the flocculant solution into the non-carbonaceous slurry at several points as the slurry passes through a baffled launder.

The amount of flocculant 26 added to non-carbonaceous slurry 24 is controlled (i) by dilution of the powder in solution and (ii) by addition of the solution to the slurry. Flocculant must be added to the slurry at a sufficient rate to produce flocs of the non-carbonaceous particles which are lyophobic to water, without causing carry-over and waste that accompancies overdosage. Addition at the proper rate is directly dependent on the concentration of solids in non-coal slurry 24, which concentration typically fluctuates widely during operation. Accordingly, the flocculant is preferably prepared in highly dilute solutions in water (typically 0.05% by weight) and large volumes of flocculant solution supplied to the slurry (0.4 liters per ton of solids [dry weight]processed) so that the dosing can be controlled and varied with precision corresponding to variation in the concentration solids in slurry 24.

To properly control the flocculant addition, both the flow rate and the solids concentration of slurry 24 must be measured, and the solids feed rate to thickener 25 continually computed. The flow of the slurry is preferably measured automatically and continually by a conventional magnetic flow meter; and the solid concentration of the slurry is preferably measured automatically and continually by a twin vibrating tube density meter which continually measures the specific gravity of the slurry. The specific gravity of the water and solids being presumably constant, the solids concentration in the slurry and in turn the solids flow rate to thickener 25 can be computed. Flocculant solution 26 can then be automatically metered into non-carbonaceous slurry 24 at a varied rate by utilizing a variable speed pump controlled by an electrical signal proportional to the computed solids flow rate, or by opening and closing a servovalve controlled by an electrical signal proportional to the difference between the measured flow rate of the flocculant solution and the desired flow rate for the computed solids flow rate.

Having achieved distribution of flocculant 26 through non-carbonaceous slurry 24 to form a second mixture, the second mixture is discharged preferably centrally into, for example, conventional thickener 25 as shown. The flocculated solids precipitate or settle to the bottom of thickener 25, while the flocculated particles, being lyophobic to water, continually exude water. The efficiency and rate of precipitation is primarily dependent on the molecular weight of the flocculant polymer and the percentage of flocculant to solids as above described. Preferably, the mixture is gently stirred by motor driven agitator 25A, e.g. at 1 or 2 revolutions per minute, to release occluded water around and between the flocculated solids, as well as aid the release of water from the lyophobic flocs by increasing the pressure of the flocs on each other. A substantially clear layer of water is thus formed at the top of thickener 25, which is separated from the second mixture through overflow 27. This reclaimed water 28 is then circulated through suitable conduit or pipe to a coal washing plant for reuse. Although it may in some instances be turbid, water 28 is sufficiently clear for reuse as processing water in a coal washing plant, i.e. less than 1% solids.

The lyophobic flocculated solids precipitate an settle to the bottom of thickener 25 where they are removed as flocculated solids or tailings 29 containing typically between 35 and 70% solids, with 55 to 65% solids being most typical. Flocculated solids 29 are generally solids containing entrained water. Alternatively, flocculated solids 29 may be in slurry form. In any case, the solids content of flocculated solids 29 is directly dependent on the pressure of the solids above and around the flocs as they are removed at the bottom of thickener 25, and is effected to only a minor or secondary extent by other variables. Accordingly, the solids content of flocculated tailings 29 can be maintained substantially constant by providing a servovalve at the outlet from the bottom of thickener 25 controlled by an electrical signal proportional to the pressure in the second mixture in the thickener. The pressure of the second mixture is typically measured by a conventional pressure device positioned through the side of thickener 25.

Generally, flocculated solids 29 are a solids mixture of consistent composition and can be disposed of in that form. Preferably, however, flocculated solids 29, whether in solid or slurry form, are conveyed to a pelletizer 30 where the solids are simulataneously dewatered and pelletized. Pelletizer 30 may be any commercially available pelletizer suitable for the particular application. Preferably, pelletizer 30 is a horizontal tumbler type such as a "Y" pelletizer, as shown, or a cylindrical pelletizer. In the pelletizer the flocculated solids 29 are tumbled into lyophobic pellets which are easily handled, and which readily meet specifications and regulations in constructing waste disposal piles. The pellets and water are removed from the pelletizer over screen 31, where the water is separated from the pellets 32 to form a substantially solids-free aqueous solution 33. The pelletized solids 32 are generally spherical pellets, with moisture contents typically of between 20 and 35% by weight and sizes of between 0.25 and 0.75 inch.

In some instances solids-free aqueous solution 33 is sufficiently clear and free of solids and flocculant that it can be recirculated to the coal washing plant as reclaimed water. However, even when the dosage rate of lyophobic flocculant 26 is accurately controlled, the percentage of flocculant carryover to solution 33 can be high. It is desirable for economic reasons, as well as for efficient operation of the coal washing plant, to reuse this water containing flocculant in the thickener 25. Accordingly, aqueous solution 33 is, in usual operation, at present recirculated and admixed with non-carbonaceous slurry 24 and/or lyophobic flocculant 26; such that the water of solution 33 is reclaimed as overflow water from the second mixture in thickener 25.

In an alternative embodiment, the flocculation and pelletizing steps can be performed concurrently in a wet-pelletizing separator or "aquapelletizer", such as the one commercially available from Ebara-Infilco Company Limited, Palaceside Building 1-1, 1-chrome, Hilotsubashi, Chiyodaku, Tokyo, Japan under the tradename "Dehydrum". The "Dehydrum" pelletizer is a relatively large horizontal rotary cylinder, e.g. 2.4 meter in diameter and 6.7 meter in length, or 3.4 meter in diameter and 9.0 meter in length, that rotates at approximately one revolution each seven to ten minutes. The interior of a "Dehydrum" pelletizer consists of three functional sections known as pelletizing section, the noncarbonaceous slurry is flocculated by the addition of lyophobic flocculant as above described, and at the same time the flocculated solids are in effect precipitated by the mechanical tumbling action given to the mixture to produce pellets of flocculated solids in a water suspension. The resulting, compacted spherical pellets of flocculated solid are suspended in substantially solids-free aqueous solution. In the separating section, the substantially clear water solution is discharged intermittently through small holes in the cylindrical wall of the rotating drum and can be recirculated to the coal washing plant or to the non-carbonaceous aqueous slurry 24 based on the conditions above described. The lyophobic pellets are conveyed to the final dewatering section by an internal spiral conveyor. In the dewatering section, the lyophobic pellets are further dewatered by tumbling prior to discharge as cake-pellets of low water content, e.g. 35% by weight. Accordingly, the "Dehydrum" pelletizer is capable of simultaneously performing the process of steps of adding lyophobic flocculant, precipitating flocculated solids and separating flocculated solids in one cylindrical device.

Figure 2:
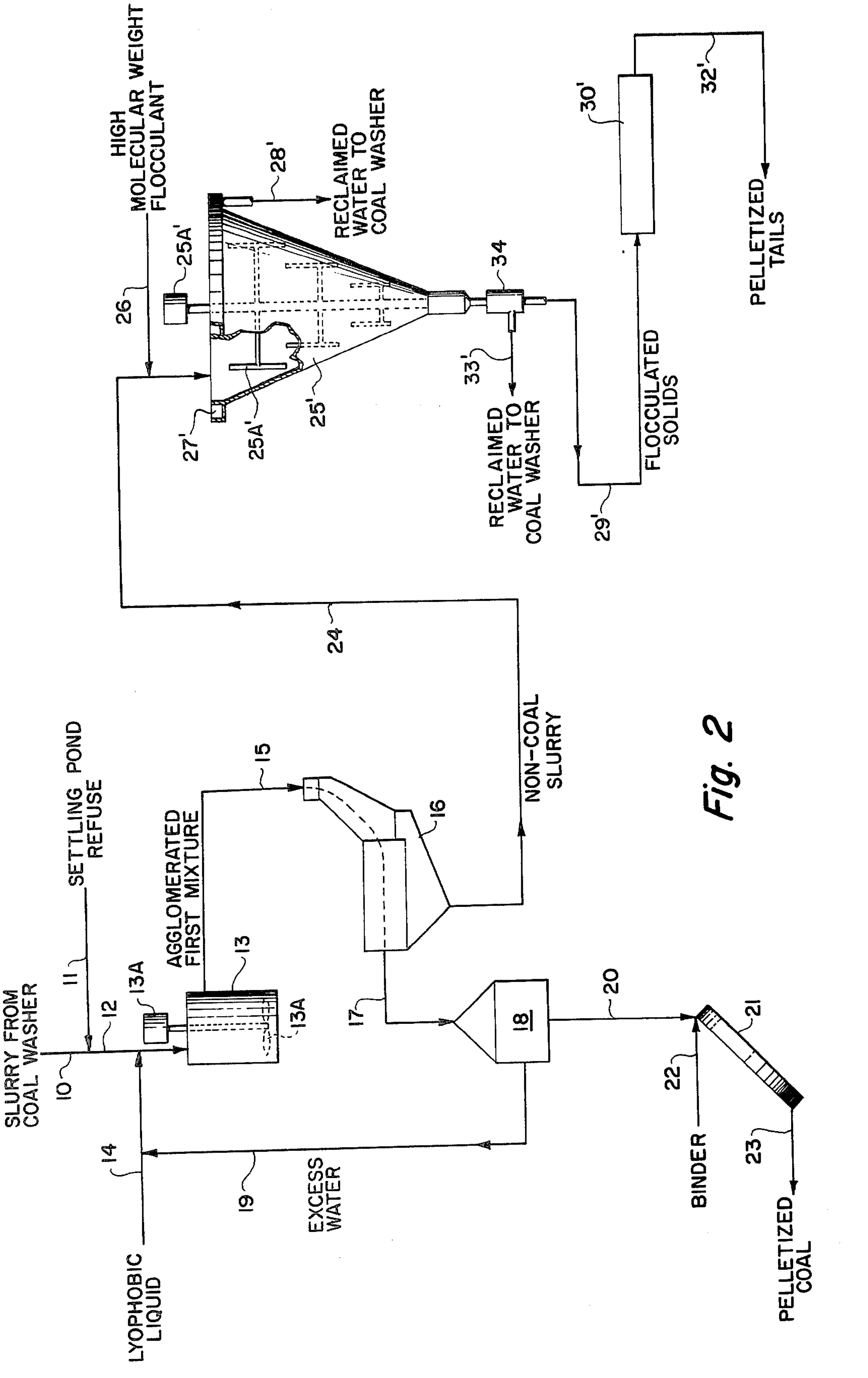
FIG. 2 is a schematic of a second, alternative method of reclaiming water and coal from coal treatment underflow by two-stage separation of solids.

Referring to FIG. 2, still another alternative method is shown for reclaiming water and carbonaceous material from coal treatment underflow. The method is the same as the method described with reference to FIG. 1 through the separation and pelletizing of the carbonaceous agglomerates and the addition of lyophobic flocculant 26 to non-carbonaceous slurry 24 to form the second mixture. The second mixture is, however, discharged to deep cone thickener 25' instead of conventional thickener 25 with agitator 25A'. The conical apparatus 25' is a settling vessel of conical or cylindoconical shape, e.g. 4 meters in diameter, and considerably less settling area than the conventional thickener. The shape and depth of conical thickener 25' provides greater hydrostatic pressure on the flocculated solids 29 discharged from the bottom of the thickener. Accordingly, solids content of the flocculated solids 29 can be increased and the use of subsequent dewatering apparatus eliminated. Agitator 25A' is utilized in cone thickener 25' to slightly stir the flocculated solids, adding to the lyophobic action of the flocs and enabling occluded water to escape from around and between the flocs.

The flocculated solids are preferably discharged from cone thickener 25' directly into liquid drain 34, where free water entrained in the flocculated solids may be drained. Liquid drain 34 is described in U.S. Pat. No. 3,423,313, granted to the same applicant and assignee as the present invention. The drain has a foraminal or perforated conduit section, through the porous wall of which free water can drain. Preferably the foraminal conduit section is surrounded by a vibratory member which vibrates the solids as they pass through the conduit to aid the escape of the entrained liquid. The solids-free solution 33' mostly of water, which is preferably free of flocculant and fines, is circulated from liquid drain 34 to the coal washer for reuse. Alternatively, solution 33' may as above described be recirculated to non-carbonaceous slurry 24 and/or lyophobic flocculant 26 when it contains substantial quantities of flocculant and/or solids.

As it emerges from mechanical thickener 34, flocculated solids 29' usually is a cake-like solid of sufficient low moisture content, i.e. less than 40% by weight, and constant consistency to be disposable. Although not necessary, flocculate solids 29' may be further dewatered and processed through pelletizer 30' to provide more easily manageable solids 32' and reclaim additional water for the system. Pelletizer 30' may be any conventional pelletizer suitable for the application. Preferably, pelletizer 30' is a horizontal tumbler type as schematically shown in FIG. 2. The water from pelletizer 30' is recirculated to the second mixture in thickener 25' (if the water contains substantial flocculant and/or solids) or to a coal washing plant (if the water is substantially free of flocculant and solids).

While the preferred embodiments of the invention have been specifically described, it is distinctly understood that the invention may be otherwise variously embodied and used within the scope of the following claims.

What is claimed is:

1. A method of reclaiming water and carbonaceous material from an aqueous slurry of carbonaceous and non-carbonaceous particles in which the slurry is at least 60% water by weight, said method comprising the steps of:

A. adding a fluid to the aqueous slurry of carbonaceous and non-carbonaceous particles to form a first mixture, in which less than 20% of the combined weight of the fluid and the carbonaceous and non-carbonaceous fine particles is fluid, said fluid being a light hydrocarbon such that it is free-flowing and in a liquid state at temperatures below 20° C., and that it is lyophilic to carbonaceous particles and lyophobic to water and non-carbonaceous particles;

B. agitating said first mixture to preferentially agglomerate said carbonaceous particles into discrete agglomerates, while the non-carbonaceous particles remain substantially unagglomerated;

C. separating the discrete agglomerates from said first mixture to form a substantially non-carbonaceous slurry;

D. adding a flocculant to said non-carbonaceous slurry to form a second mixture, said flocculant being lyophobic to water and lyophilic to non-carbonaceous particles;

E. removing a precipitate and separating water from said second mixture; and

F. separating flocculated solids from said precipitate to form a substantially solids-free aqueous solution.

2. A method of reclaiming water and carbonaceous material from an aqueous slurry of carbonaceous and non-carbonaceous particles as set forth in claim 1 wherein:

said flocculant has a molecular weight of at least about 100,000.

3. A method of reclaiming water and carbonaceous material from an aqueous slurry of carbonaceous and non-carbonaceous particles as set forth in claim 1 wherein:

said flocculant has a molecular weight of at least about 1,000,000.

4. A method of reclaiming water and carbonaceous material from an aqueous slurry of carbonaceous and non-carbonaceous particles as set forth in claim 1 and further comprising the step of:

G. recirculating the water separated from said second mixture to a coal washing process.

5. A method of reclaiming water and carbonaceous material from an aqueous slurry of carbonaceous and non-carbonaceous particles as set forth in claim 4 and further comprising the step of:

H. recirculating said solids-free aqueous solution to said second mixture.

6. A method of reclaiming water and carbonaceous material from an aqueous slurry of carbonaceous and non-carbonaceous particles as set forth in claim 1 and further comprising the step of:

G. recirculating said solids-free aqueous solution to said second mixture.

7. A method of reclaiming water and carbonaceous material from an aqueous slurry of carbonaceous and non-carbonaceous particles as set forth in claim 1 and further comprising the steps of:

G. adding a binder liquid to the discrete agglomerates to form a third mixture said binder liquid being lyophobic to water and lyophobic to carbonaceous material; and H. agitating said third mixture to dewater and pelletize the discrete agglomerates.

8. A method of reclaiming water and carbonaceous material from an aqueous slurry of carbonaceous and non-carbonaceous particles as set forth in claim 1 and further comprising:

G. pelletizing the flocculated solids separated from the precipitate.

9. A method of reclaiming water and carbonaceous material from an aqueous slurry of carbonaceous and non-carbonaceous particles as set forth in claim 8 wherein:

the step G of pelletizing is performed at least partially concurrently with step E of removing a precipitate and with step F of separating flocculated solids said concurrent steps being carred out in a single apparatus.

10. A method of reclaiming water and carbonaceous material from an aqueous slurry of carbonaceous and non-carbonaceous particles as set forth in claim 1 wherein:

step E of removing a precipitate is performed at least partially concurrently with step F of separating flocculated solids, said concurrent steps being carried out in a single apparatus.

11. A method of reclaiming water and carbonaceous material from an aqueous slurry of carbonaceous and non-carbonaceous particles, said method comprising the steps of:

A. adding an aqueous slurry of carbonaceous and non-carbonaceous particles having a relatively high solids content to an aqueous slurry of carbonaceous and non-carbonaceous particles having a relatively low solids content to form a processable aqueous slurry of carbonaceous and non-carbonaceous particles that is at least 60 percent water by weight;

B. adding a fluid to the processable aqueous slurry to form a first mixture in which less than 20 percent of the combined weight of the fluid and the carbonaceous and non-carbonaceous particles is fluid, said fluid being a light hydrocarbon such that it is free-flowing and in a liquid state at temperatures below 20° C., and that it is lyophilic to carbonaceous particles and lyophobic to water and non-carbonaceous particles;

C. agitating said first mixture to preferentially agglomerate said carbonaceous particles into discrete agglomerates while the non-carbonaceous particles remain substantially unagglomerated;

D. separating the discrete agglomerates from said first mixture to form a substantially non-carbonaceous slurry;

E. adding a flocculant to said non-carbonaceous slurry to form a second mixture, said flocculant being lyophobic to water and lyophilic to non-carbonaceous particles;

F. removing a precipitate and separating water from said second mixture; and

G. separating flocculated solids from said precipitate to form a substantially solids-free aqueous solution.

12. A method of reclaiming water and carbonaceous material from an aqueous slurry of carbonaceous and non-carbonaceous particles as set forth in claim 11 wherein:

said flocculant has a molecular weight of at least about 100,000.

13. A method of reclaiming water and carbonaceous material from an aqueous slurry of carbonaceous and non-carbonaceous particles as set forth in claim 11 wherein:

said flocculant has a molecular weight of at least about 1,000,000.

14. A method of reclaiming water and carbonaceous material from an aqueous slurry of carbonaceous and non-carbonaceous particles as set forth in claim 11 and further comprising the step of:

H. recirculating the water separated from said second mixture to a coal washing process.

15. A method for reclaiming water and carbonaceous material from an aqueous slurry of carbonaceous and non-carbonaceous particles as set forth in claim 14 and further comprising the step of:

I. recirculating said solids-free aqueous solution to said second mixture.

16. A method of reclaiming water and carbonaceous material from an aqueous slurry of carbonaceous and non-carbonaceous particles as set forth in claim 11 and further comprising the step of:

H. recirculating said solids-free aqueous solution to said second mixture.

17. A method of reclaiming water and carbonaceous material from an aqueous slurry of carbonaceous and non-carbonaceous particles as set forth in claim 11 and further comprising the steps of:

H. adding a binder liquid to the discrete agglomerates to form a third mixture, said binder liquid being lyophobic to water and lyophilic to carbonaceous material; and I. agitating said third mixture to dewater and pelletize the discrete agglomerates.

18. A method of reclaiming water and carbonaceous material from an aqueous slurry of carbonaceous and non-carbonaceous particles as set forth in claim 11 and further comprising in addition:

H. pelletizing the flocculated solid separated from the precipitate.

19. A method of reclaiming water and carbonaceous material from an aqueous slurry of carbonaceous and non-carbonaceous particles as set forth in claim 18 wherein:

the step H of pelletizing is performed at least partially concurrently with step F of removing a precipitate and with step G of separating flocculated solids said concurrent steps being carried out in a single apparatus.

20. A method of reclaiming water and carbonaceous material from an aqueous slurry of carbonaceous and non-carbonaceous particles as set forth in claim 11 wherein:

Step F of removing a precipitate is performed at least partially concurrently with step G of separating flocculated solids, said concurrent steps being carried out in a single apparatus.

* * * * *